April 7, 1931.  C. W. HUNT  1,799,236
CUTTING DEVICE FOR MANDREL WOUND COIL FILAMENTS
Filed March 30, 1929  5 Sheets-Sheet 1
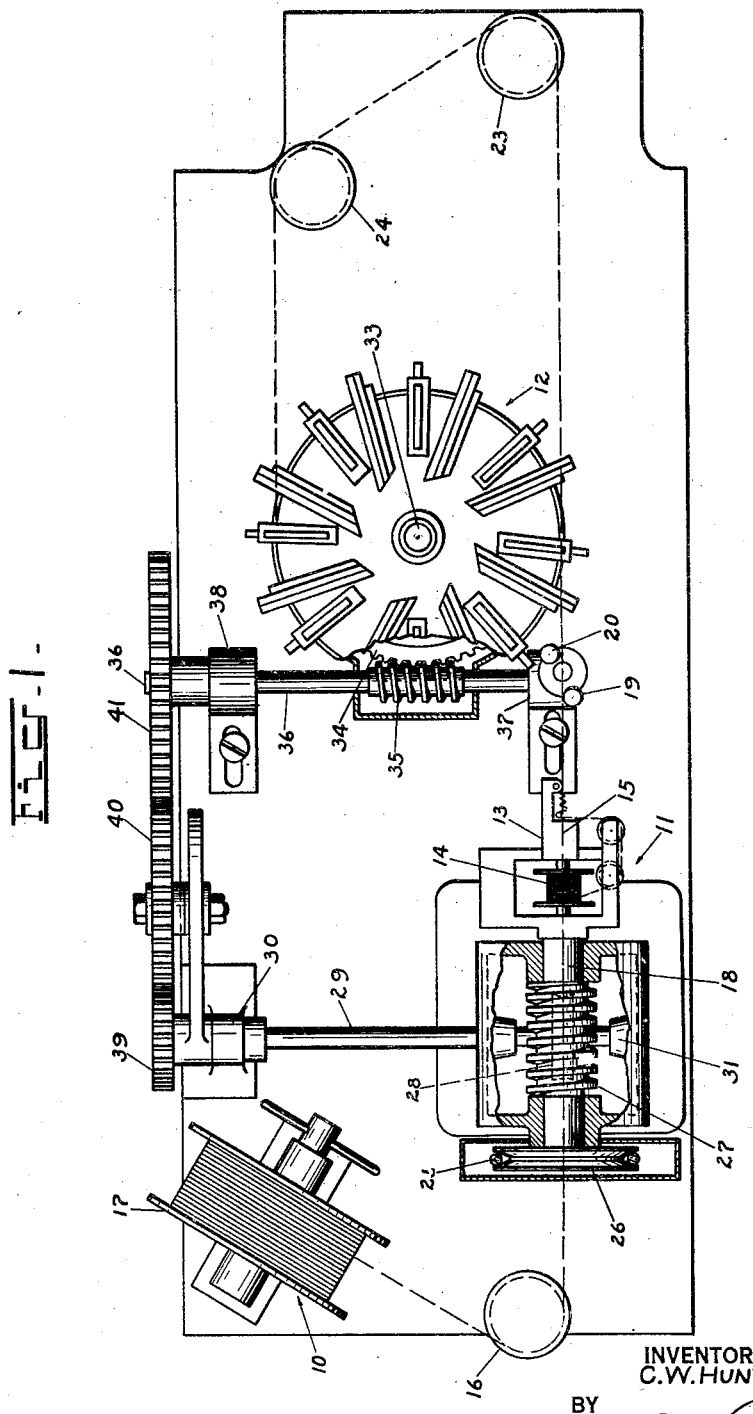
INVENTOR
C.W. HUNT
BY
ATTORNEY

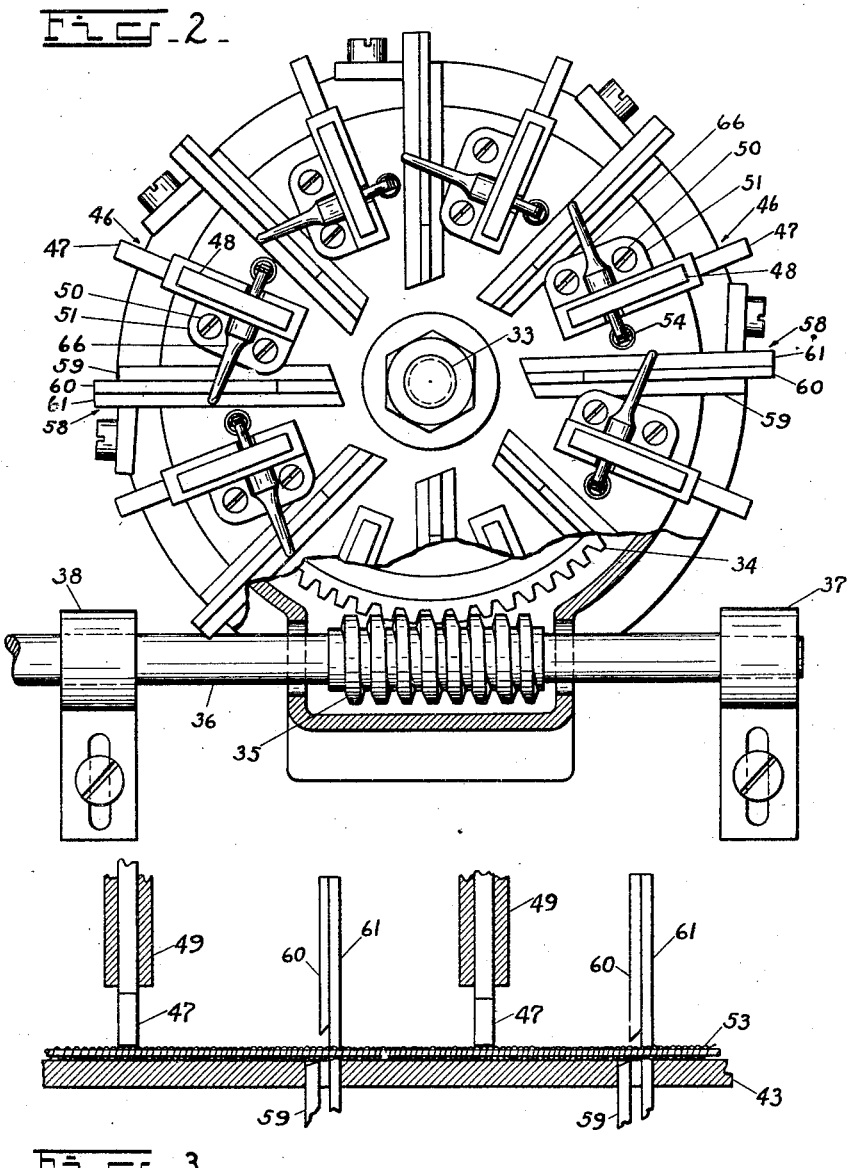

April 7, 1931. C. W. HUNT 1,799,236
CUTTING DEVICE FOR MANDREL WOUND COIL FILAMENTS
Filed March 30, 1929 5 Sheets-Sheet 3
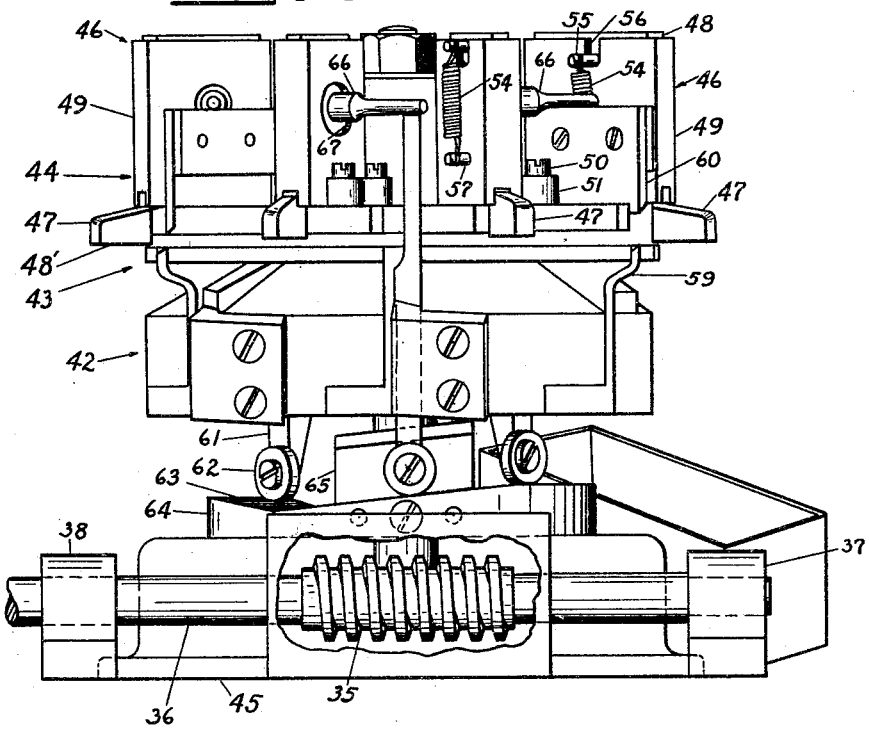
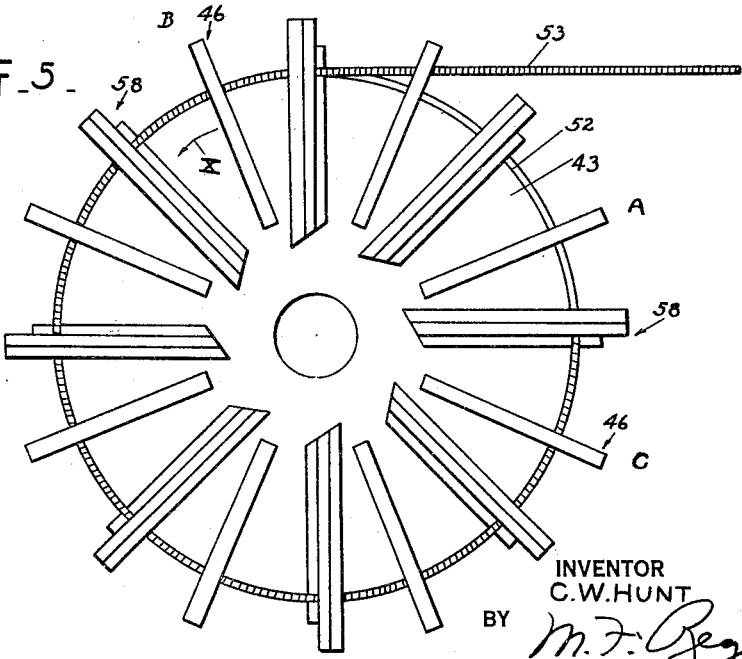
INVENTOR
C.W. HUNT
BY
ATTORNEY April 7, 1931.                C. W. HUNT                1,799,236
            CUTTING DEVICE FOR MANDREL WOUND COIL FILAMENTS
                  Filed March 30, 1929      5 Sheets-Sheet 4
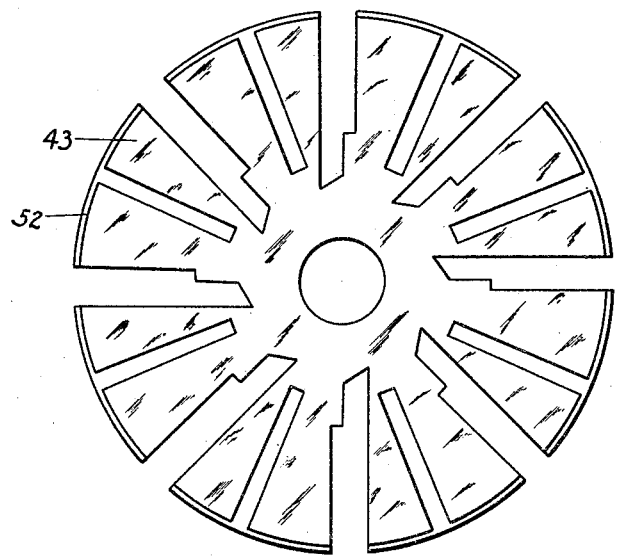
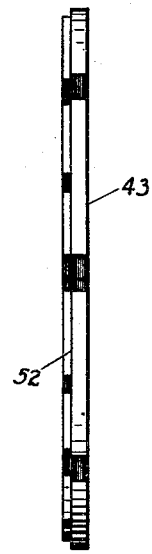
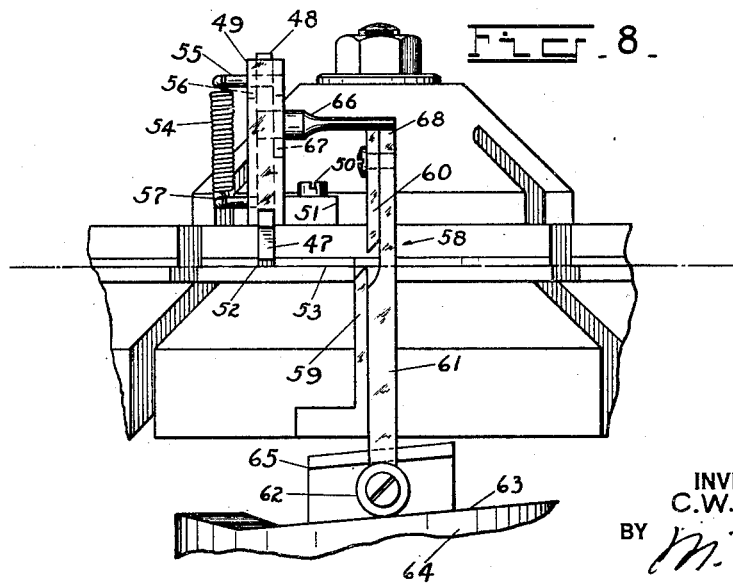
INVENTOR
C.W. HUNT
BY
ATTORNEY April 7, 1931.  C. W. HUNT  1,799,236
CUTTING DEVICE FOR MANDREL WOUND COIL FILAMENTS
Filed March 30, 1929  5 Sheets-Sheet 5
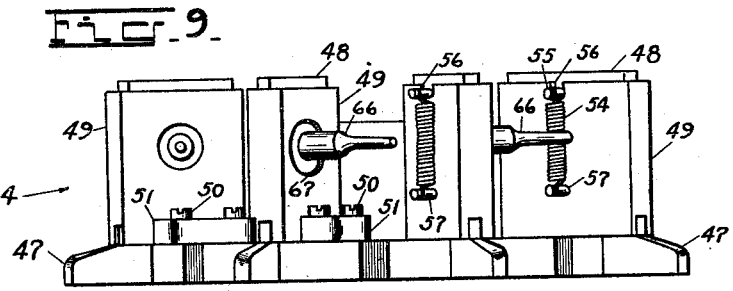
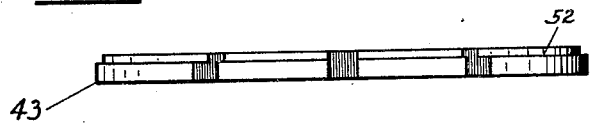
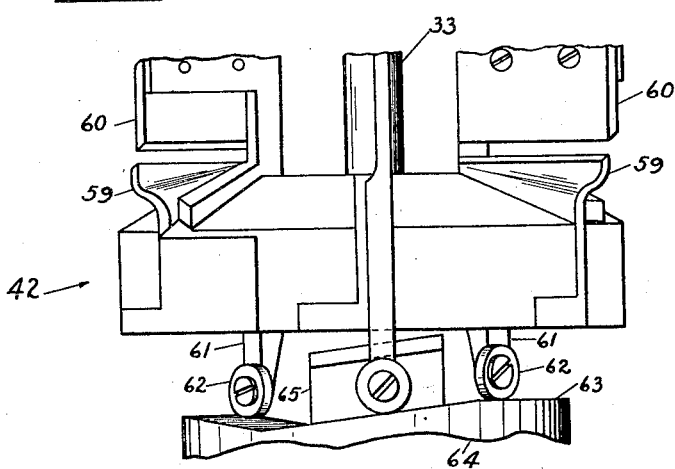
INVENTOR
C. W. HUNT
BY
ATTORNEY Patented Apr. 7, 1931

1,799,236

UNITED STATES PATENT OFFICE

CHARLES W. HUNT, OF WYOMING, NEW JERSEY, ASSIGNOR TO WESTINGHOUSE LAMP COMPANY, A CORPORATION OF PENNSYLVANIA

CUTTING DEVICE FOR MANDREL-WOUND COIL FILAMENTS

Application filed March 30, 1929. Serial No. 351,205.

This invention relates to the manufacture of a coiled filament of the mandrel wound type and relates more particularly to a machine for accurately cutting an indefinite length of filament into short sections for use as light giving elements in incandescent electric lamps.

An object of the invention is to provide a simple and efficient machine for cutting a length of coiled filament into sections of uniform lengths.

Another object of the invention is to provide a coil cutting mechanism operable in combination with a coil winding machine for automatically receiving and severing helically coiled wire.

Other objects and advantages of the invention will be more fully understood by reference to the following description together with the accompanying drawings in which, Fig. 1 is a plan view of the present invention applied to a machine for coiling a filament wire about a mandrel.

Fig. 2 is an enlarged plan view of mechanism for cutting the wound filament into sections, parts of the machine being shown in section to illustrate internal structure.

Fig. 3 is a diagrammatic fragmentary view showing a coiled wire in position to be severed.

Fig. 4 is a side elevational view of mechanism for cutting coiled wire into sections in accordance with the present invention.

Fig. 5 is a fragmentary plan view showing the relative positions of gripping members and cutters disposed on a conveyor.

Fig. 6 is a plan view of a removable guide plate.

Fig. 7 is an edge view of a plate shown in Fig. 6.

Fig. 8 is a fragmentary view showing a portion of the clamping and cutting mechanism.

Fig. 9 is a view of a removable head upon which is mounted a plurality of clamping jaws.

Fig. 10 is an edge view of a guide plate and shows the same removed from the machine.

Fig. 11 is a side elevational view of a carrier ready to receive the guide plate shown in Fig. 10.

Although the present invention is applicable for the cutting of an indefinite length of wire or like material into predetermined sections, the invention is illustrated in connection with a machine for coiling a filamentary wire about a mandrel which filament is subsequently severed into short sections.

As illustrated in Fig. 1 a practical embodiment of the invention may include a source of wire supply 10, a coil winding mechanism 11 and a cutting device 12. The device 12 which operates to sever the coiled filamentary wire and mandrel, will hereinafter be termed, wire cutting mechanism. Any suitable type of coil winding machine, such as indicated by the numeral 11 may be employed. The one shown comprises a winding head 13 upon which is carried a spool 14 of filament wire to be wound around a mandrel 15, the mandrel wire may be guided over pulley 16 from a spool 17, thence through a spindle or hollow shaft 18 between guide pulleys 19 and 20 and over guide pulleys 23 and 24 and into the wire cutting mechanism 12.

The wire coiling head 13 may be driven through motion transmitted from any suitable source such as a motor (not shown) connected by a belt 25 with pulley 26 secured to shaft 18 upon which the head 13 is mounted. The shaft 18 is provided with a worm 27 in mesh with a worm wheel 28 secured to a counter shaft 29 rotatable in bearings 30 and 31.

The wire cutting mechanism is of the conveyor or rotary type and is mounted on a central vertical shaft 33, having secured thereto a worm wheel 34 in mesh with a worm 35 on a counter shaft 36 mounted in bearings 37 and 38. Motion is transmitted to the shaft 36 from the counter shaft 29, the said shaft 29 being provided with a gear wheel 39 in mesh with an idler gear wheel 40 which is disposed in mesh with gear wheel 41 secured to shaft 36. By changing the gear ratio in the gear trains 39, 40 and 41 the speed of linear translation of the wire may be varied and the pitch of the wound helix changed.

Referring more particularly to the coil cutting mechanism the same will be more fully understood with reference to Figs. 2 and 4. As shown in Fig. 4 this mechanism consists primarily of three units, a lower unit 42 which constitutes a carrier, an intermediate unit consisting of a guide plate 43 and an upper unit or head 44. The carrier 42 is mounted to rotate about the shaft 33, the said shaft being suitably secured in a bed plate 45. The wire cutting mechanism comprises a plurality of gripper members 46. The gripper members are of similar construction and as shown each may include a jaw 47 having a contact surface 48' disposed radially with respect to the axis of rotation of the machine.

The machine may as a whole be termed, a conveyor since it not only operates to grip and cut the wire but to draw the wound wire from the wire coiling machine serving as a part of this latter mechanism. The jaw 47 is provided with a slide plate 48 movable in a vertical guide 49 secured to the head by a suitable bolt 50 extending through a foot 51 integral with the guide 49. The jaw 47 functions in conjunction with a ledge 52 of the guide plate 43 to grip the wire 53.

The jaw 47 is normally urged toward the guide plate by means of a spring 54 having one end connected to a pin 55 secured in the slide plate 48 and extending through a slot 56 on one side of the guide. The opposite end of the spring is secured to a pin 57 secured to and extending from the guide.

For the purpose of cutting the wire, cutter elements 58 are provided each of which elements may consist of a bed knife 59 and a reciprocal knife 60. For the purpose of actuating the knife 60 the same is provided with a leg 61 terminating in a roller 62, disposed in contact with a cam surface 63 of a cam element 64, the cam element 64 is arranged to encircle the axis of rotation of the conveyor so that the roller or cam follower 62 will traverse the surface 63 to lift the knife 60. For the purpose of causing the knife 60 to descend and sever the wire, a box cam 65 is provided and suitably positioned so that as the cam follower travels therethrough the knife 60 will shear the wire in conjunction with the bed knife 59.

The movable knife 60 is arranged to cause an upward movement of the jaw 47 and for this purpose the slide plate 48 of the said jaw is provided with an arm 66 which extends through a slot 67 of the guide 49. The free end of the arm 66 is arranged to be engaged by an upper end 68 of the leg 61 upon which the knife 60 is mounted. As shown in Fig. 5 the gripper elements 46 and the cutter elements 58 are positioned alternately in spaced relation around the conveyor. Thus the wire to be severed may be led around the guide plate 43 and supported on the ledge 52 thereof.

The cutting mechanism rotates in the direction of the arrow "X" and at point "A" the jaws are opened, while at point "B" the jaws are closed, thus as the conveyor rotates each succeeding jaw will be moved to grip the wire at point "B" and will remain closed until reaching point "C". When the jaws reach point "C" the cutter operates to sever the wire and as a jaw moves from point "C" it begins to open, thus releasing the severed section, which drops off into a suitably positioned receptacle, the jaw remaining open until it again moves to position "B" whereupon it is actuated to again grip the wire.

It will be evident that by reason of the present construction, the wire to be cut is gripped at a plurality of points and held against slippage so that when a cutter is actuated to sever the wire intermediate the gripping members, all of the sections of wire severed will be of uniform lengths.

When operating the present machine to cut coiled filament into sections it is necessary to provide convenient means for changing the length of the sections. For example, the machine may set up to cut sections of given lengths for use in 60 watt lamps and it may happen that coil of different wattage lamps are required.

In the present invention the plate 43 controls the length of the cut since by increasing or decreasing the diameter of the plate the coils will be cut further from or nearer to the center of the machine since the cutting edges are radially disposed and the position of the ledge 52 of the plate determines the effective point along the cutting knives. The plate 43 may be quickly and conveniently removed and another of a different dimension substituted. Thus coils of any length within a wide range may be produced without excessive labor or consumption of time.

The present wire cutting machine operates as part of the coiling machine. Heretofore when coiling a wire about a mandrel it was necessary to have a drum to receive the wire. The drum was rotated and served to draw the mandrel and wire wound thereon from the coiling head. Obviously the drum constituted part of the coil winding mechanism. In the present construction the coil cutting mechanism answers the function of the drum but whereas in machines as heretofore used it was necessary to remove the coiled wire from the drum and then cut the wire into sections, the present machine automatically functions to cut the coiled wire into sections of uniform lengths. It will therefore be evident that by combining the present wire cutting mechanism with the coiling mechanism a new result is obtained and the mechanism is simplified.

Although a preferred embodiment of the invention is shown and described herein it is to be understood that modifications may be made therein without departing from the spirit and scope of the invention as set forth in the appended claims.

What is claimed is:

1. In combination with a coil winding machine, a plurality of means for gripping and moving a length of coiled wire from said machine and means intermediate and movable with said first mentioned means for cutting the said coiled wire into sections of predetermined lengths.

2. In combination with a machine for winding a wire helically about a mandrel, a pair of members for engaging coiled wire to move the same from the coil winding machine and cutting means intermediate said engaging means for severing sections of predetermined lengths of said coiled wire.

3. A machine of the class described comprising means for winding a wire into a continuous helix, a plurality of gripping members, means for moving the said gripping members, means for causing said members to alternately grip, and release said helix so that a movement of said members causes a movement of said helix from said first mentioned means and means between adjacent gripping members for severing said helix.

4. A machine for moving a wire from a source of supply comprising a rotary conveyor, a plurality of gripping members on said conveyor, means for rotating said conveyor and means for alternately gripping and releasing a wire during a movement of the conveyor to cause the wire to move from said source of supply and means intermediate said gripping means for severing said wire.

5. A machine of the class described comprising a plurality of pairs of wire gripping members, means for actuating said members to grip a wire at different points along its length and means intermediate each pair of gripping members for severing the wire.

6. A machine of the class described comprising a plurality of movable gripping means, disposed in spaced relation to secure a wire at different points along its length and wire severing means disposed adjacent to each of said gripping means.

7. A machine for cutting an indefinite length of wire into sections comprising a plurality of gripping members, means for moving said members through a given path; means for actuating said members to grip a wire at a plurality of points along its length, cutter members disposed intermediate said gripping members and means for actuating said cutter members.

8. A machine for cutting an indefinite length of wire into sections comprising a plurality of gripping members, means for moving said members through a given path; means for actuating said members to grip a wire at a plurality of points along its length and a plurality of cutter devices for cutting said wire at a point intermediate said gripping members.

9. A machine for cutting an indefinite length of wire into sections comprising a carrier, a source of wire supply, a plurality of gripping means disposed in spaced relation on said carrier, cutting means intermediate said gripping means, means for actuating said gripping means to move said wire from said source of supply, means for severing a section from said wire and means for releasing said severed section.

10. A machine for cutting an indefinite length of wire into sections comprising a pair of members for gripping a wire at a plurality of points, means intermediate said members for severing a section of a given length from said wire and means for varying the space relation of said gripping and severing means to vary the length of a severed section.

11. A machine for cutting an indefinite length of wire into sections comprising a circular conveyor, a plurality of wire gripping members disposed in spaced relation around the periphery of said conveyor, said members having wire gripping surfaces extending radially of said conveyor, means for causing said jaws to grip a wire between points on said gripping surfaces a predetermined distance from the center of said conveyor said means being replaceable for means for causing the wire to be gripped at points on said jaws a different distance from the center of said conveyor and means for severing said wire intermediate two of said gripping members.

12. A machine for cutting an indefinite length of wire into sections comprising a rotary conveyor, a plurality of wire gripping elements having wire gripping surfaces disposed radially of said conveyor, means for guiding a wire for engagement with given points on said gripping surfaces, means for actuating said members to grip a wire, means for rotating said conveyor and means for severing the wire between gripping elements.

13. A machine for cutting an indefinite length of wire into sections comprising a conveyor, a plurality of gripping members disposed in spaced relation about said conveyor, guide means for guiding a wire between said members so as to cause the members to grip points on said wire in given predetermined spaced relation, said guide means being removable for the substitution of another guide to cause the jaws to grip different predetermined points on said wire and means for severing the wire between two gripping members.

14. A machine for cutting an indefinite length of wire into sections comprising a conveyor, a plurality of gripping members disposed in spaced relation about said conveyor, a circular guide having a ledge to support a wire between said members so as to cause the members to grip points on said wire in given predetermined spaced relation, said guide being removable for the substitution of another circular guide to cause the jaws to grip different predetermined points on said wire and means for severing the wire between two gripping members.

In testimony whereof, I have hereunto subscribed my name this 29th day of March, 1929.

CHARLES W. HUNT.